(12) United States Patent
DuHack et al.

(10) Patent No.: US 9,217,515 B2
(45) Date of Patent: Dec. 22, 2015

(54) REDUCED NOISE VALVE MECHANISM

(71) Applicant: Nidec Motor Corporation, St. Louis, MO (US)

(72) Inventors: Michael R. DuHack, Indianapolis, IN (US); Joseph LaBonte, Indianapolis, IN (US)

(73) Assignee: Nidec Motor Corporation, St. Louis, MO (US)

( * ) Notice: Subject to any disclaimer, the term of this patent is extended or adjusted under 35 U.S.C. 154(b) by 337 days.

(21) Appl. No.: 13/828,026

(22) Filed: Mar. 14, 2013

(65) Prior Publication Data

US 2014/0264109 A1 Sep. 18, 2014

(51) Int. Cl.
*F16K 31/12* (2006.01)
*F16K 47/16* (2006.01)
*F16K 31/40* (2006.01)

(52) U.S. Cl.
CPC ............... *F16K 47/16* (2013.01); *F16K 31/404* (2013.01)

(58) Field of Classification Search
CPC ....... F16K 47/16; F16K 47/203; F16K 47/04; F16K 31/404; Y10T 137/7808; Y10T 137/7869; Y10T 137/7896; Y10T 137/7785; Y10T 137/7789; Y10T 137/8597; Y10T 137/87587; Y10T 137/2526
See application file for complete search history.

(56) References Cited

U.S. PATENT DOCUMENTS

| | | | | |
|---|---|---|---|---|
| 2,562,415 A | * | 7/1951 | Norris | 137/625.28 |
| 5,082,240 A | * | 1/1992 | Richmond | 251/120 |
| 5,509,407 A | * | 4/1996 | Schuler | 128/205.24 |
| 5,921,275 A | | 7/1999 | Knop et al. | |
| 6,187,186 B1 | * | 2/2001 | Zhadanov et al. | 210/198.1 |
| 6,378,542 B1 | * | 4/2002 | DuHack | 137/8 |
| 6,460,367 B1 | * | 10/2002 | DuHack | 62/337 |
| 7,178,782 B1 | | 2/2007 | York | |
| 7,182,857 B2 | | 2/2007 | Koslow et al. | |
| 7,222,642 B2 | | 5/2007 | DuHack et al. | |
| 7,240,693 B2 | | 7/2007 | Knop | |
| 2004/0231727 A1 | * | 11/2004 | Nomichi et al. | 137/505.25 |
| 2006/0265151 A1 | * | 11/2006 | DuHack et al. | 702/53 |
| 2012/0080097 A1 | * | 4/2012 | Cheng et al. | 137/154 |

* cited by examiner

*Primary Examiner* — Jessica Cahill
(74) *Attorney, Agent, or Firm* — Hovey Williams LLP (57) ABSTRACT

A valve assembly is provided to control the flow of a fluid therethrough. The valve assembly includes a valve body and a pressure-regulating assembly. The valve body defines an inlet, an outlet, and a flow path extending therebetween. The pressure-regulating assembly includes a longitudinally extending piston tube, a venturi element, and a vent. The piston tube is shiftably mounted in the valve body and at least in part defines an outer chamber. The flow path extends through the piston tube. The venturi element is disposed in the flow path. The vent fluidly interconnects the flow path and the outer chamber such that a pressure drop associated with fluid flow through the venturi element draws fluid from the outer chamber through the vent and into the flow path.

23 Claims, 9 Drawing Sheets

REDUCED NOISE VALVE MECHANISM

BACKGROUND OF THE INVENTION

1. Field of the Invention

The present invention relates generally to a fluid valve mechanism. More particularly, the present invention concerns a valve mechanism to reduce noise associated with fluid flow therethrough.

2. Discussion of the Prior Art

Those of ordinary skill in the art will appreciate that flow control devices or valves are often used in home appliances such as dishwashers, ice makers, washing machines, and toilets. A fluid flowing through such a valve may, in some instances, experience cavitation. For instance, cavitation may occur when fluid flows from a higher pressure area to a lower pressure area within a valve. Cavitation produces shock waves that in some instances produce audible noise and may even cause physical damage to nearby structures. It is therefore desirable to regulate the fluid velocity and pressure throughout the valve in order to avoid cavitation-producing conditions.

SUMMARY

According to one aspect of the present invention, a valve assembly configured to control the flow of a fluid therethrough is provided. The valve assembly includes a valve body and a pressure-regulating assembly. The valve body defines an inlet, an outlet, and a flow path extending therebetween. The pressure-regulating assembly includes a longitudinally extending piston tube, a venturi element, and a vent. The piston tube is shiftably mounted in the valve body and at least in part defines an outer chamber. The flow path extends through the piston tube. The venturi element is disposed in the flow path. The vent fluidly interconnects the flow path and the outer chamber such that a pressure drop associated with fluid flow through the venturi element draws fluid from the outer chamber through the vent and into the flow path.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
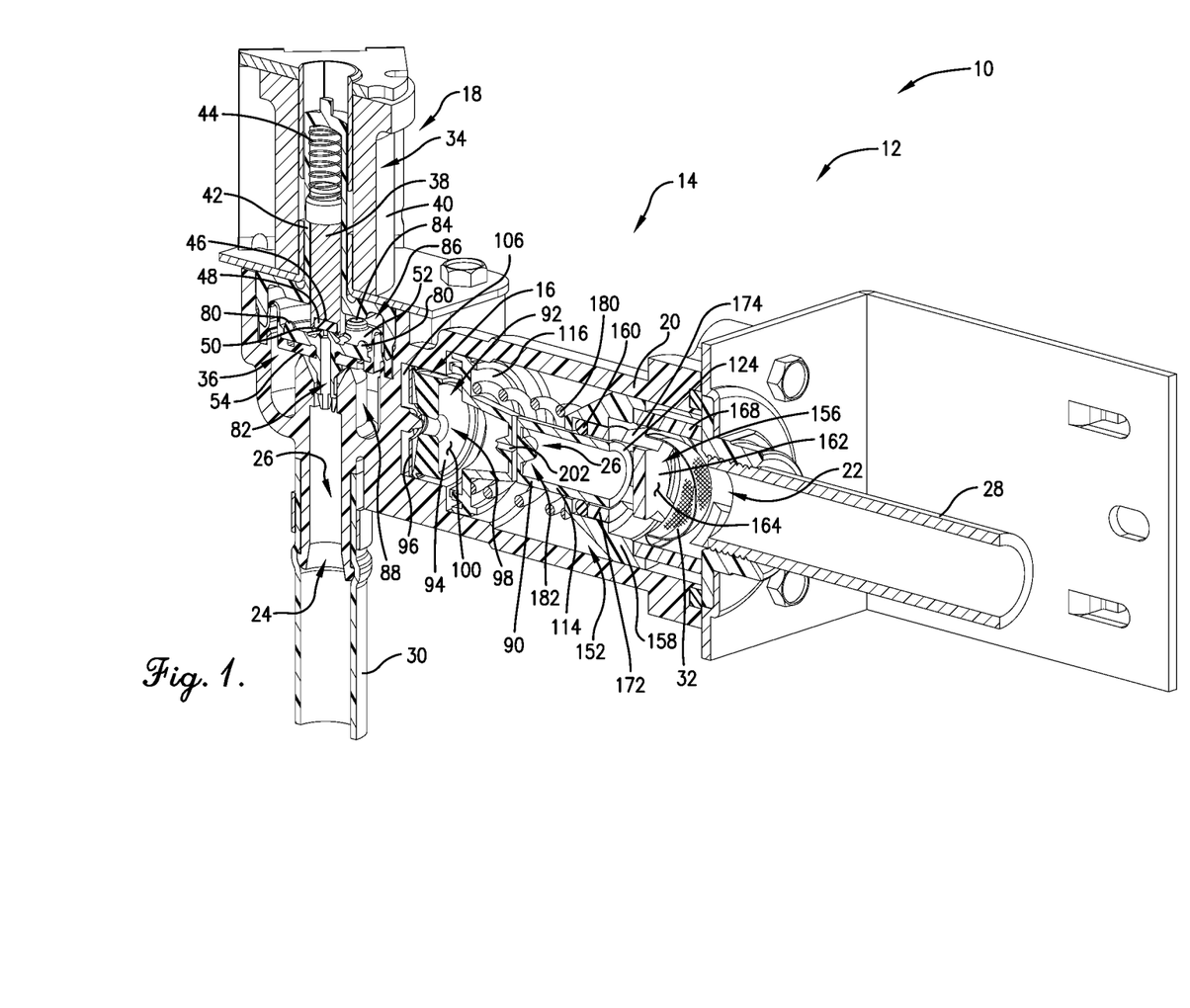
FIG. 1 is a cross-sectional perspective view of a valve assembly including a valve portion and a pressure-regulating portion in accordance with the principles of a first embodiment of the present invention, wherein the piston tube of the pressure-regulating portion is in its downstream position and the armature and diaphragm assembly of the valve portion are both lowered so as to completely close the valve.

With initial reference to FIG. 1, an appliance 10, including a valve assembly 12 constructed in accordance with a first preferred embodiment of the present invention, is depicted. The appliance may suitably be any one of a variety of types, including but not limited to toilets, dishwashers, refrigerators, freezers, ice machines, coffee makers, or washing machines. The valve assembly 12 is preferably configured for use during refilling of a component of the appliance (e.g. refilling of a toilet tank or bowl after flushing) and is preferably configured to minimize the generation of noise due to cavitation during operation. The appliance may suitably include electronic controls (not shown) accessed via a user interface (also not shown) to control the filling or other process, although this is not necessary within the scope of the present invention. Presence of signaling or display devices (not shown) to inform a user of the progress of the filling or other process is also desirable but not required.

As shown in FIG. 1 and others, in a preferred embodiment, the valve assembly 12 broadly includes a pressure-regulating portion 14, a flow control assembly 16, and a valve portion 18. The valve portion 18 preferably includes a valve body 20 defining an inlet 22, an outlet 24, and a flow path 26 extending therebetween. The appliance 10 preferably includes inlet piping 28 and outlet piping 30 extending from the inlet 22 and the outlet 24, respectively.

Preferably, fluid flows along the flow path 26 from the inlet 22, through the pressure-regulating portion 14, to the flow control assembly 16. A screen 32 or other filtration device may be provided between the inlet 22 and the pressure-regulating portion 14, although it is permissible for no screen or filter to be provided. The fluid then preferably flows through the flow control assembly 16 to the valve portion 18, which is configured to selectively allow or obstruct fluid flow to the outlet 24.

Figure 4:
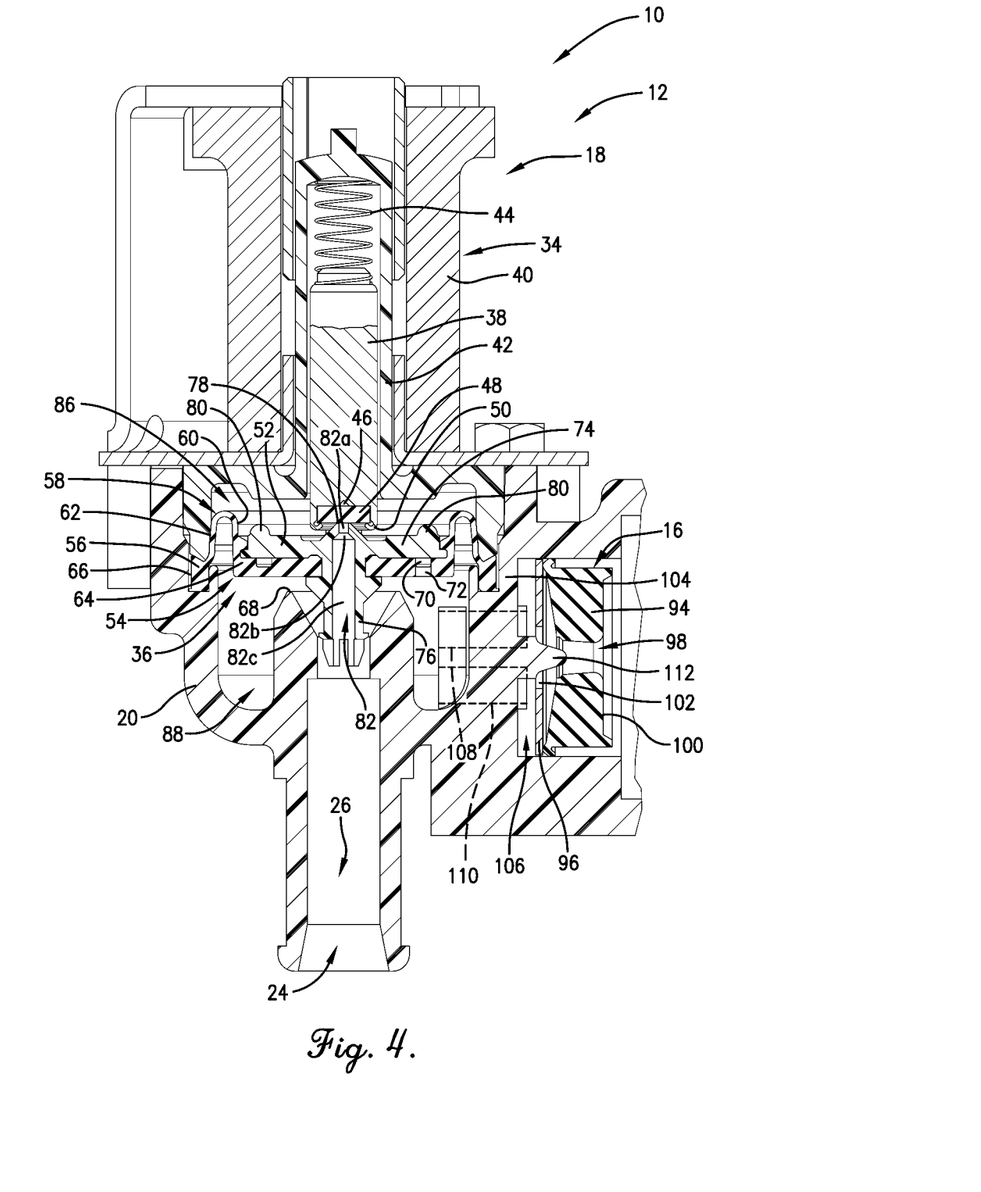
FIG. 4 is an enlarged cross-sectional view of the valve portion of the valve assembly of FIGS. 1-3, wherein the armature is lowered to close the pilot hole of the diaphragm insert and the diaphragm assembly is in an intermediate position.
Figure 5:
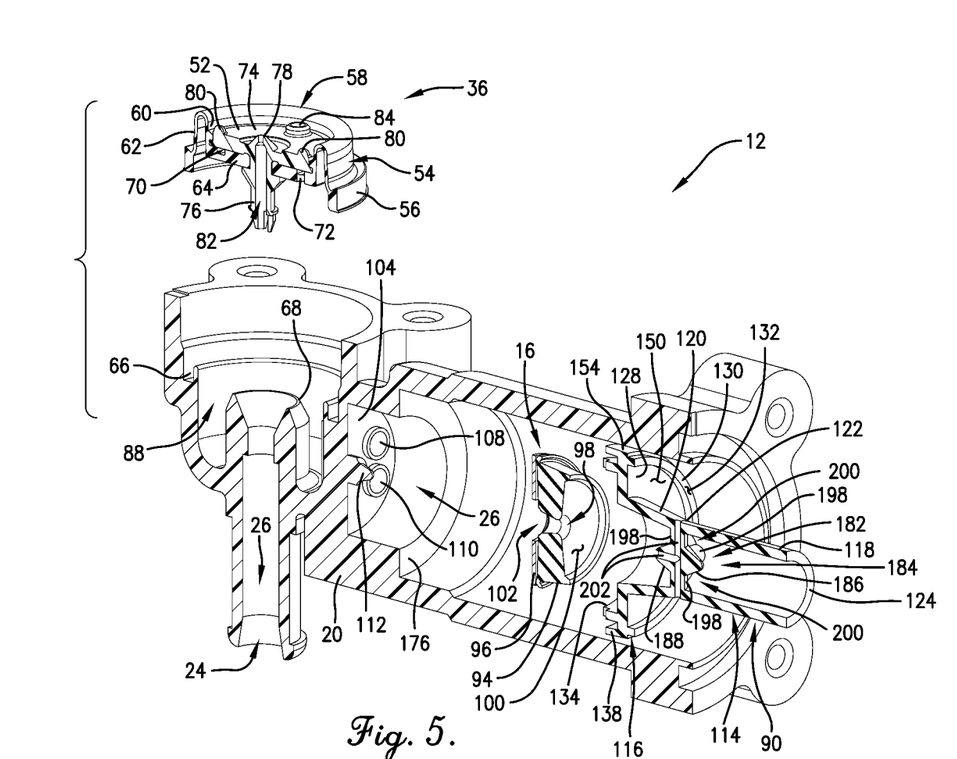
FIG. 5 is an enlarged, fragmentary, cross-sectional perspective view of a portion of the valve assembly of FIGS. 1-3 from an upstream viewpoint, particularly illustrating the plurality of openings or orifices that collectively define a fluid flow path through the valve assembly.

As best shown in FIG. 4, the valve portion 18 preferably includes an armature assembly 34 and a diaphragm assembly 36. The armature assembly 34 preferably includes a magnetically responsive armature 38 that is actuated by a solenoid 40, although any type of armature and/or actuation means known in the art is permissible without departing from the scope of the present invention. The valve assembly 12 further preferably includes a guide member 42. Preferably, the armature 38 is slidably interfitted in the guide member 42. The guide member 42 also preferably houses an armature spring 44 that is configured to bias the armature 38 in a downward direction.

The armature 38 preferably includes a recess 46 in which an armature insert 48 is housed. Preferably, the armature insert 48 comprises a rubber material, although any one or more of a variety of materials may be used without departing from the scope of the present invention. Preferably, the armature 38 includes a rolled end 50 configured to retain the armature insert 48 in the recess 46.

The diaphragm assembly 36 preferably includes a diaphragm insert 52 and a diaphragm 54. The diaphragm insert 52 preferably comprises an at least substantially rigid plastic material, while the diaphragm 54 preferably comprises a resiliently flexible material such as ethylene propylene (EP) rubber. However, it is permissible for any one or more of a variety of materials to be used for either or both of the diaphragm insert and the diaphragm.

Figures 6, 7:
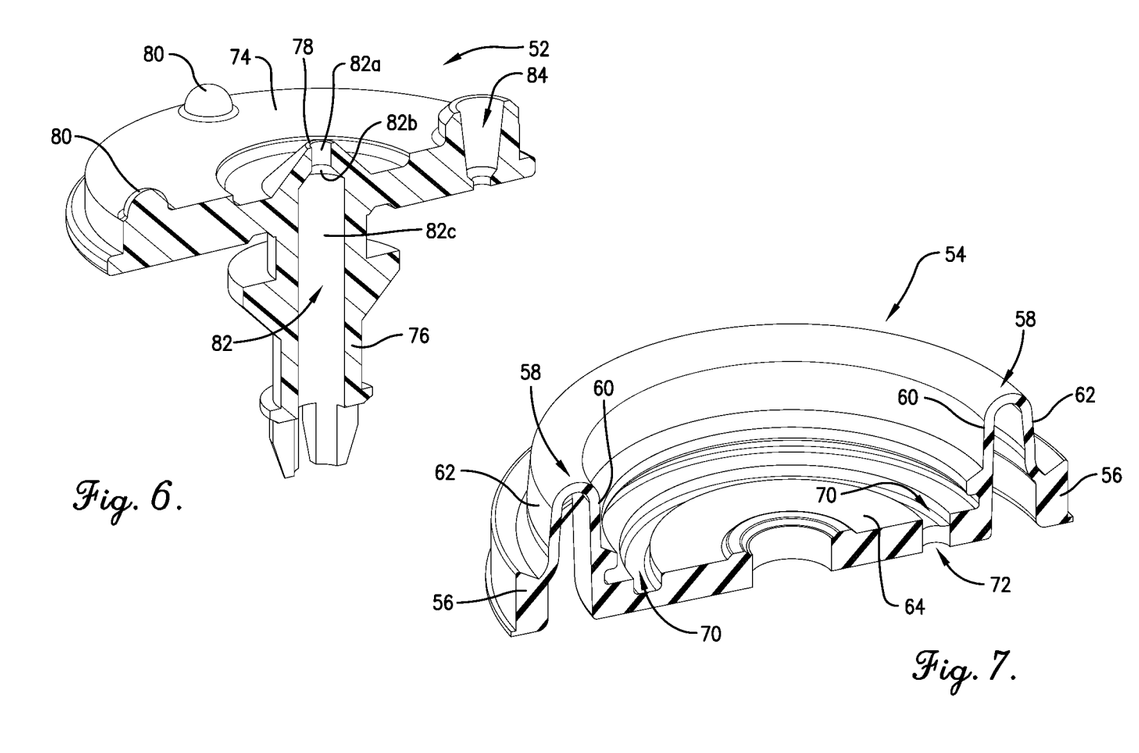
FIG. 6 is an enlarged, cross-sectional view of the diaphragm insert of FIGS. 1-5, particularly illustrating the pilot hole, the bleed hole, and the stops.
FIG. 7 is an enlarged, cross-sectional view of the diaphragm of FIGS. 1-5, particularly illustrating the channel and the aperture.

As best shown in FIG. 7, the diaphragm 54 preferably includes an outer flange 56 that sealingly engages the guide member 42, a hollow rolled rim 58 having an inner wall 60 and an outer wall 62, and an at least substantially flat base 64.

The rim 58 is preferably configured such that raising or lowering of the diaphragm assembly 36 results in changes to the heights of the inner wall 60 and the outer wall 62, with an increase in the height of one of the inner and outer walls 60 and 62, respectively, corresponding to a decrease in the height of the other of the inner and outer walls 60 and 62, respectively.

In a preferred embodiment, the valve body 20 defines a groove 66. The outer flange 56 of the diaphragm 54 preferably sits in the groove 66 and is secured therein by the guide member 42.

The valve body 20 also preferably defines a valve seat 68 that is configured to sealingly engage the diaphragm 54 in certain circumstances that are discussed in more detail below.

Preferably, a channel 70 is formed in the base 64 of the diaphragm 54, and an aperture 72 extends through the base 64 of the diaphragm 54. As shown in FIG. 7, the channel 70 preferably extends arcuately through the base 64, and the aperture 72 extends from the channel 70 so as to be in fluid communication therewith. However, it is permissible for the channel to define an alternatively shaped path through the base, for multiple apertures to be provided, or for any of a variety of other alternative arrangements to be implemented without departing from the scope of the present invention.

The diaphragm insert 52 preferably includes a plate 74 and a plug 76 extending downward therefrom. The plate 74 preferably includes a raised pilot seat 78 at its center and a plurality of arcuately spaced apart stops 80 arcuately arranged radially outwardly from the pilot seat 78.

The stops 80 are preferably configured to provide a buffer between the guide member 42 and the remainder of the diaphragm assembly 36 when the diaphragm assembly 36 is in its uppermost or most elevated position (not illustrated).

As shown in FIG. 6 and others, a pilot hole 82 is preferably defined through the pilot seat 78 and the plug 76. The pilot hole 82 preferably includes a constricted region 82a, a transition region 82b, and an expanded region 82c.

Furthermore, a bleed hole 84 is preferably defined through the plate 74. The bleed hole 84 is preferably configured to be in fluid communication with the channel 70 and, in turn, the aperture 72 of the base 64 of the diaphragm 54, such that a fluid flowing through the bleed hole 84 subsequently flows through the channel 70 and out the aperture 72, or vice versa.

Although the above-described configuration of the diaphragm insert 52 is preferred, any one or more of a variety of modifications may be implemented without departing from the scope of the present invention. Among other things, for instance, only a single stop might be provided, the stops might be arranged differently, the pilot seat might be offset, and/or a plurality of bleed holes might be provided.

The diaphragm assembly 36 and the guide member 42 preferably cooperatively define an upper chamber 86, while the diaphragm assembly 36 and the valve body 20 preferably cooperatively define a lower chamber 88.

In operation of the valve portion 18, several general configurations of the armature assembly 34 and the diaphragm assembly 36 are presented. For instance, in FIG. 1, both the armature assembly 34 and the diaphragm assembly 36 are in their lowermost positions. In this configuration, the solenoid 40 is deactivated; and the armature spring 44 therefore retains the armature insert 48 against the pilot seat 78 to form a seal over the pilot hole 82. Furthermore, the diaphragm 54 is in sealing engagement with the valve seat 68. Flow of a fluid to the outlet 24 is thereby prohibited.

Figure 2:
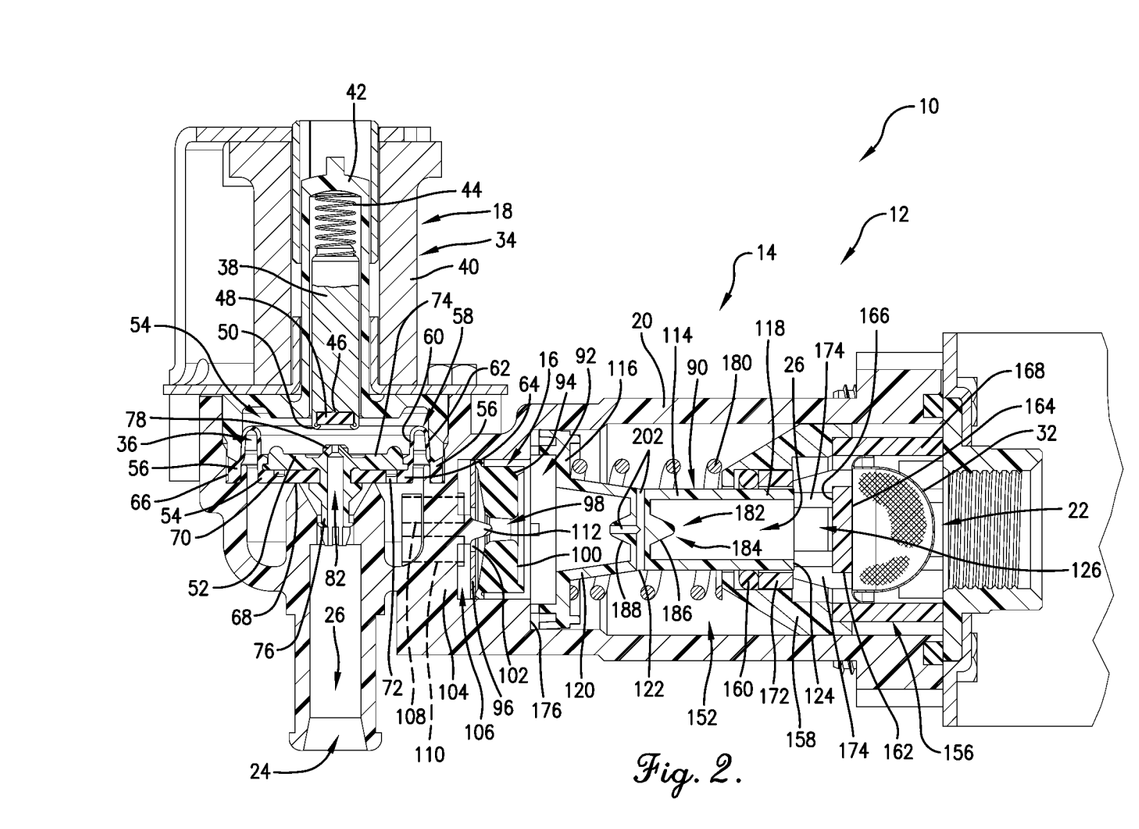
FIG. 2 is a cross-sectional view of the valve assembly of FIG. 1, wherein the piston tube is in its downstream position, the armature is raised to open the pilot hole of the diaphragm insert, and the diaphragm assembly remains lowered.

In the configuration illustrated in FIG. 2, the solenoid 40 has been activated to raise the armature 38 and thus open the pilot hole 82. However, the diaphragm 54 remains in sealing contact with the valve seat 68. In this configuration, fluid in the upper chamber 86 will begin to flow to the outlet 24 via the pilot hole 82. A pressure imbalance is created across the diaphragm assembly 36, with a greater pressure being exerted on the bottom side of the diaphragm assembly 36 than on the top side.

Figure 3:
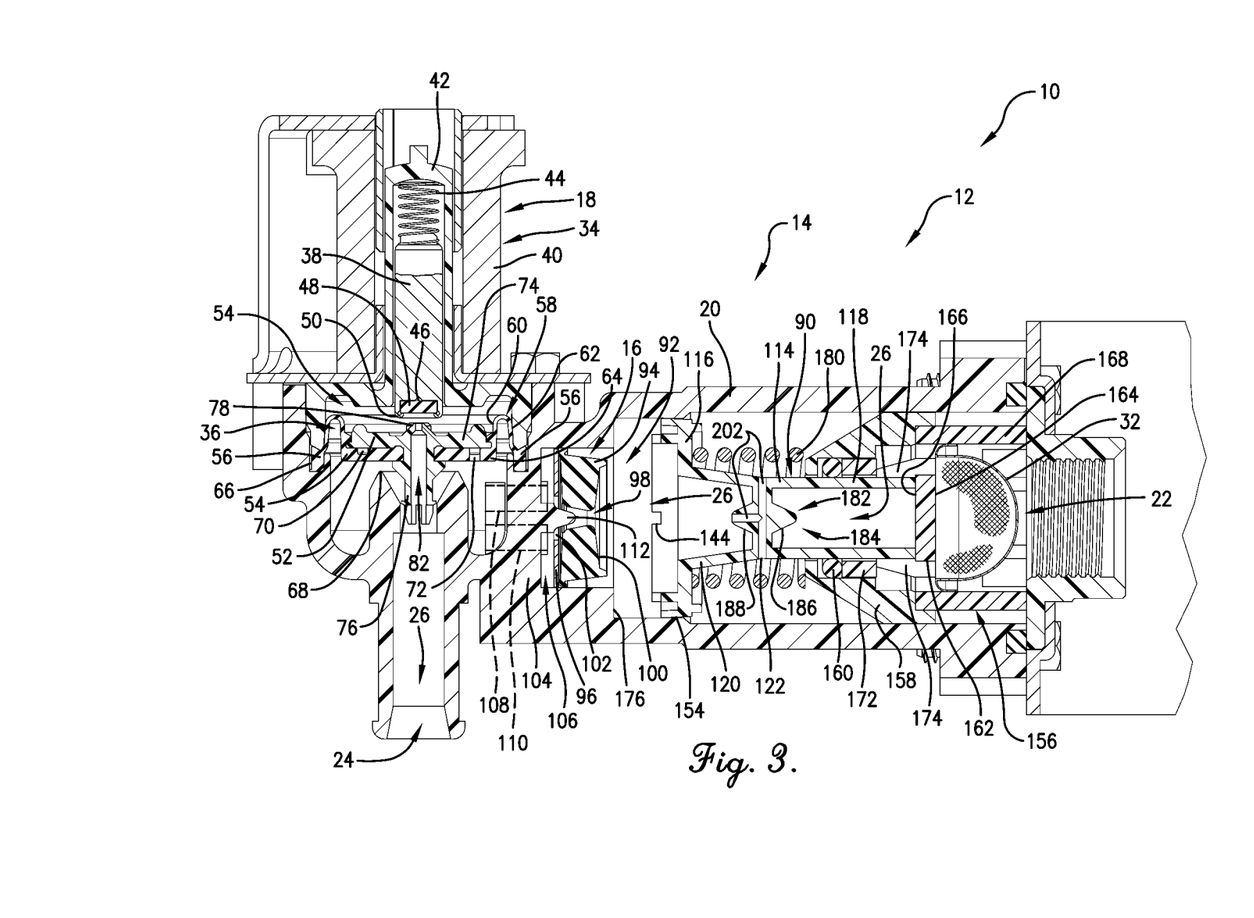
FIG. 3 is a cross-sectional view of the valve assembly similar to FIG. 2, but showing the piston tube in its upstream position, the armature raised to such an extent that the pilot hole of the diaphragm insert is open, and the diaphragm assembly in an intermediate position.

As shown in FIG. 3, a pressure imbalance such as that described above preferably leads to the lifting of the diaphragm assembly 36 away from the valve seat 68, such that fluid in the lower chamber 88 can flow over the valve seat 68. Upon further lifting of the diaphragm assembly 36 from the illustrated intermediate position toward its uppermost position (not illustrated), such fluid is additionally able to flow past the plug 76 of the diaphragm insert 52 to the outlet 24. The momentum of such flow provides an upward force operable to maintain the diaphragm assembly 36 in an elevated position until a further change occurs in the configuration of the valve assembly 12. The venturi effect created by the preferred complemental configuration of the plug 76 and the tapered portion of the valve body 20 also ensures that the diaphragm is maintained in a lifted position.

As shown in FIG. 4, deactivation of the solenoid 40 preferably results in lowering of the armature 38 and consequent resealing of the pilot hole 82 by engagement of the armature insert 48 and the pilot seat 78. Sealing of the pilot hole 82 results in increasing pressure in the upper chamber 86, since fluid can no longer exit via the pilot hole 82. When the downward force (due at least in part to the pressure in the upper chamber 86 and the force exerted by the armature spring 44) becomes greater than the upward force, the diaphragm assembly 36 likewise shifts downward, such that the diaphragm 54 sealingly engages the valve seat 68. The armature assembly 34 furthers its downward shift in conjunction with that of the diaphragm assembly 36 due to the force provided by the armature spring 44. Ultimately, the valve portion 18 preferably returns to the configuration illustrated in FIG. 1.

Although the above-described valve portion configuration is preferable, the valve portion could be alternatively configured to control flow through the flow path. In fact, with respect to certain aspects of the present invention, virtually any flow control device or structure can be positioned within the flow path.

In a preferred embodiment, the pressure-regulating portion 14 includes a longitudinally extending piston tube 90 shiftably mounted in the valve body 20. Preferably, the flow path 26 passes through the piston tube 90 and presents a downstream chamber 92 fluidly located between the piston tube 90 and the outlet 24. More preferably, the flow path 26 presents the downstream chamber 92 between the piston tube 90 and the valve portion 18 of the valve assembly 12. As will be discussed in greater detail below, the piston tube 90 is preferably configured to at least substantially regulate pressure within the downstream chamber 92 by shifting within the valve body 20.

Preferably, the downstream chamber 92 is in part defined by the flow control assembly 16. More particularly, in a preferred embodiment, the flow control assembly 16 includes a resiliently deformable flow control member 94 and a washer 96. The flow control member 94 preferably defines a central passage 98 therethrough and presents an upstream face 100 exposed to the downstream chamber 92. The washer 96 is preferably positioned downstream of the flow control member 94 to provide rigid support thereto. The washer 96 preferably includes a washer opening 102 that at least substantially aligns with the central passage 98. It is permissible, however, for the central passage 98 and/or the washer opening 102 to be offset relative to each other and/or the flow path 26. It is also permissible for the washer to be omitted entirely or replaced with an alternative structure capable of providing structural support to the flow control member.

The washer 96 preferably sealingly engages the valve body 20 such that a fluid in the flow path must pass through the central passage 98 and the washer opening 102 to travel past (i.e., to the downstream side of) the flow control member 94 and the washer 96.

Preferably, the flow control member 94 is configured to deform in such a manner that the central passage 98 shrinks when a pressure applied to the upstream face 100 by fluid in the downstream chamber 92 increases and expands when a pressure applied to the upstream face 100 by fluid in the downstream chamber 92 decreases.

Preferably, the flow control member 94 comprises a rubber such as ethylene propylene (EP) rubber. However, it is permissible for the flow control member to comprise any one or more of a variety of materials.

Preferably, the valve body 20 includes a dividing wall 104 positioned downstream of the washer 96. The dividing wall 104 preferably separates or is jointly part of the pressure-regulating portion 14 and the valve portion 18.

The washer 96 and the dividing wall 104 at least in part preferably define a dispersion chamber 106 therebetween. A pair of transition portals 108 and 110, best shown in FIGS. 2 and 3 (hidden lines) and FIG. 4, are preferably formed in the dividing wall 104 so as to be in fluid communication with the dispersion chamber 106 and to fluidly interconnect the pressure-regulating portion 14 and the valve portion 18. It is permissible for more transition portals or only a single transition portal to be provided, however, and to be positioned in any arrangement suitable for fluidly interconnecting the pressure-regulating portion and the valve portion.

A fluid in the flow path 26 preferably passes from the inlet 22, through the piston tube 90 to the downstream chamber 92, through the central passage 98 of the flow control member 94 and the washer opening 102 into the dispersion chamber 106, and through the transition portals 108 and 110 into the valve portion 18.

In a preferred embodiment, a bullet 112 projects through the washer opening 102 and into the central passage 98 of the flow control member 94. The extent to which the bullet 112 extends into the central passage 98 may vary without departing from the scope of the present invention, or the bullet may be omitted entirely. Fluid preferably flows about the bullet 112 as it travels downstream toward the valve portion 18.

The bullet 112 is preferably integrally formed with the valve body 20, although it is permissible for a non-integral bullet to be provided. Preferably, the bullet 112 extends from the dividing wall 104, such that it passes through the dispersion chamber 106 prior to reaching the washer opening 102 and the central passage 98.

In operation of a preferred embodiment, a fluid flowing though the downstream chamber 92 exerts a pressure on the upstream face 100 of the flow control member 94. The flow control member 94 then deforms or maintains its shape accordingly, such that the central passage 98 expands, contracts, or maintains its cross-sectional dimension. The velocity of the fluid flowing through the central passage 98 is affected by the size of the central passage 98, with associated fluid pressure likewise being affected. Thus, the flow-control member 28 preferably acts as a fluid velocity and pressure regulator. The fluid velocity and pressure are preferably further influenced by the presence of the bullet 112.

In a preferred embodiment, the flow control member 94 and associated structures (e.g., the washer 96 and the bullet 112) are configured to minimize or eliminate the occurrence of cavitation through control of or influence upon fluid velocity and pressure. As will be discussed in greater detail below, in a preferred embodiment, the pressure-regulating portion 14 is configured to at least substantially regulate the pressure applied on the upstream face 100 of the flow control member 94 by fluid in the downstream chamber 92. Such pressure regulation preferably enhances the extent to which the flow control member 94 and associated structures can eliminate cavitation.

As best shown in FIGS. 1-3, the piston tube 90 preferably includes a longitudinally extending tube body 114 defining a longitudinal axis. The piston tube 90 further preferably includes a flange 116 extending outwardly from the tube body 114. The axis is preferably linear, and the flange 116 preferably extends substantially radially from the tube body 114 so as to be at least substantially orthogonal to the axis. However, it is permissible for generally non-orthogonal arrangements to be used, as well. Furthermore, it is within the scope of the present invention for the tube axis to be non-linear or to include multiple linear and/or non-linear segments in a fully or partially aligned or offset arrangement.

In a preferred embodiment, the tube body 114 includes an upstream portion 118 and a downstream portion 120 that adjoin at a transition point 122. It is permissible, however, for additional portions and associated transition points to be present. Furthermore, a smooth transition or transitions might be provided, such that distinct transition points are impossible or at least difficult to define.

The upstream portion 118 preferably presents a uniform cross-section along the longitudinal axis, while the downstream portion 120 preferably presents an expanding cross-section along the longitudinal axis in a downstream direction. However, it is permissible for either or both of the upstream portion and the downstream portion to present a constant cross-section, an expanding cross-section, and/or a shrinking cross-section. Preferably, the expansion or shrinkage is linear, although nonlinear changes are permissible.

Preferably, the cross-sections are circular, although it is permissible for non-circular cross-sections to be defined. Furthermore, the cross-sectional shapes of the portions of the tube body may vary along the axis without departing from the scope of the present invention. Still further, any of the above variations may be accompanied by or effected at least in part by variations in the wall thickness of the tube (e.g., the outside dimension may be constant while the inside dimension progressively increases or decreases to define an internal taper or expansion).

Preferably, the tube body defines a pressure-receiving rim 124 facing the upstream direction. The pressure-receiving rim 124 is preferably orthogonal to the longitudinal axis of the tube body 114, although it is permissible for a non-orthogonal arrangement to be used.

In a preferred embodiment, the flow path 26 presents an upstream chamber 126 located between the rim 124 of the piston tube 90 and the inlet 22, with pressure in the upstream chamber 126 being exerted against the pressure-receiving rim 124.

Figures 8, 9:
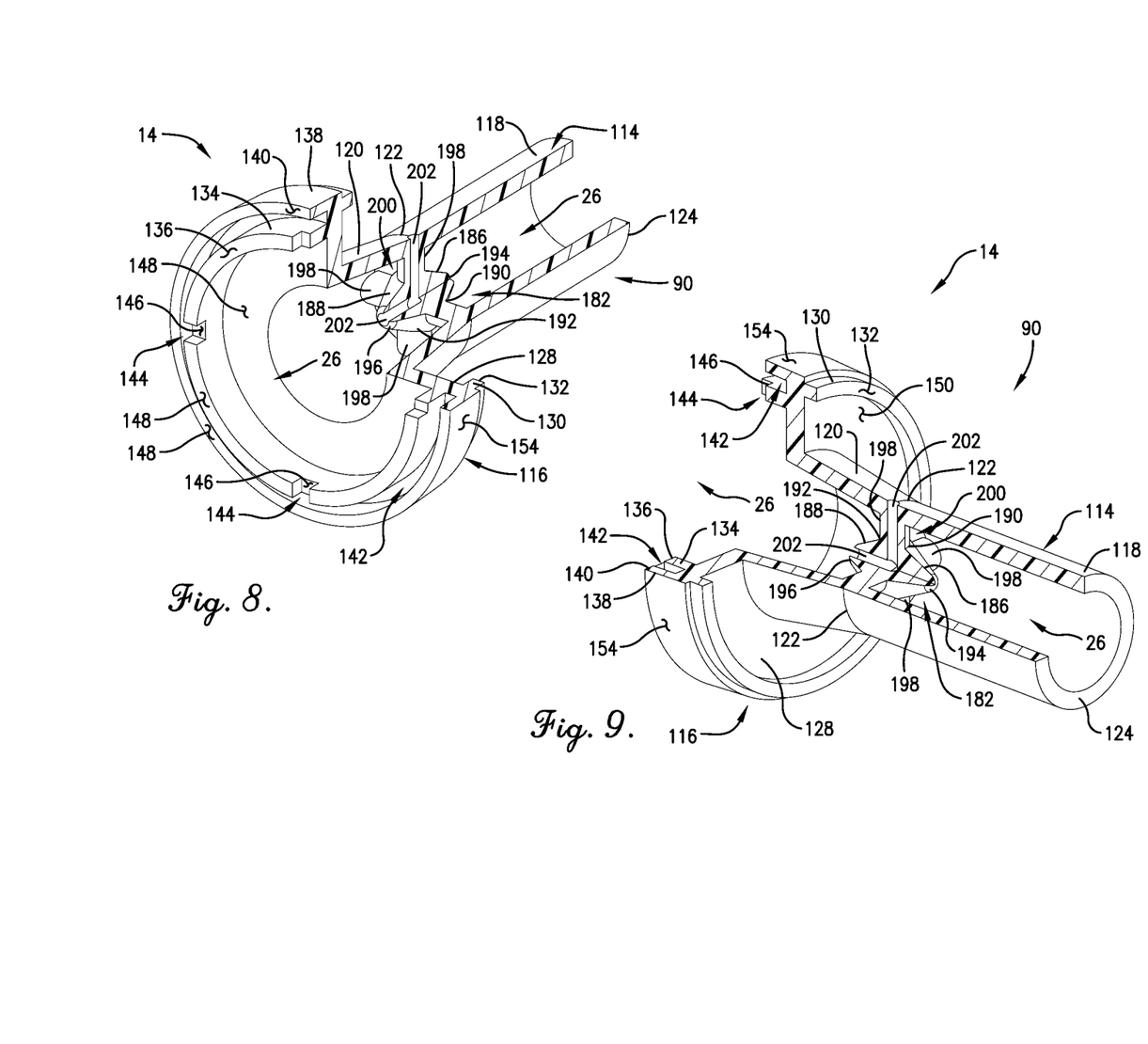
FIG. 8 is an enlarged, partially sectioned perspective view of the piston tube of FIGS. 1-5 from a downstream viewpoint.
FIG. 9 is partially sectioned perspective view of the piston tube of FIG. 8 from an upstream viewpoint.

As best shown in FIGS. 8 and 9, the flange 116 of the piston tube 90 preferably includes a radially extending plate 128, an upstream projection 130 defining an upstream surface 132, an inner downstream projection 134 defining an inner downstream surface 136, and an outer downstream projection 138 defining an outer downstream surface 140. The plate 128 and the inner and outer downstream projections 134 and 138, respectively, preferably define a channel 142 therebetween.

In a preferred embodiment, the inner downstream projection 134 extends past the outer downstream projection 138 in the downstream direction and includes a plurality of arcuately spaced apart notches 144 formed therein. Preferably, the notches 144 are of such depth that the inner notch surface 146 defined by each notch 144 is in transverse alignment with the outer downstream surface 140.

In a preferred embodiment, the plate 128, including the portion of the plate 128 that in part defines the channel 142; the inner and outer downstream surfaces 136 and 140, respectively; and the inner notch surfaces 146 define a pressure-receiving face 148. Furthermore, the plate 128 and the upstream projection 130 preferably define an upstream face 150 opposite the pressure-receiving face 148.

Preferably, the pressure-receiving face 148 at least in part defines the downstream chamber 92, such that fluid pressure within the downstream chamber 92 is exerted against the pressure-receiving face 148.

Preferably the upstream face 150, the tube body 114, and the valve body 20 at least in part cooperatively define an at least substantially enclosed outer chamber 152. It is permissible for the outer chamber 152 to be partially at least substantially open, however. For instance, the valve body could be removed in whole or in part adjacent the outer chamber, such that the chamber would be open to the surrounding atmosphere to any extent desired.

The upstream projection 130 and the inner and outer downstream projections 134 and 138, respectively, of the flange 116 each preferably extend at least substantially longitudinally from the plate 128. However, it is preferable that the outer downstream projection 138 also flares slightly radially outwardly from the plate 128. More particularly, the outer downstream projection 138 preferably includes an outer sealing surface 154 configured to sealingly engage the valve body 20. Provision of a slight outward flare in the outer downstream projection 138 of the flange 116 enables a more tolerant and potentially tighter fit between the valve body 20 and the sealing surface 154 after insertion of the piston tube 90 into the valve body 20.

The seal formed between the valve body 20 and the sealing surface 154 is preferably at least substantially fluid tight, such that fluid flow therethrough between the downstream chamber 92 and the outer chamber 152 is at least substantially prohibited.

The piston tube 90 is preferably slidably supported by a tube retainer 156 so as to be movable relative to the valve body 20. The tube retainer 156 is preferably supported in the valve body 20 by an end plug 158, with a gasket 160 preferably provided between the end plug 158, the tube retainer 156, and the piston tube 90 to at least substantially fluidly seal the interface.

Preferably, the end plug 158 cooperates with the upstream face 150, the tube body 114, and the valve body 20 to further define the outer chamber 152.

Figure 11:
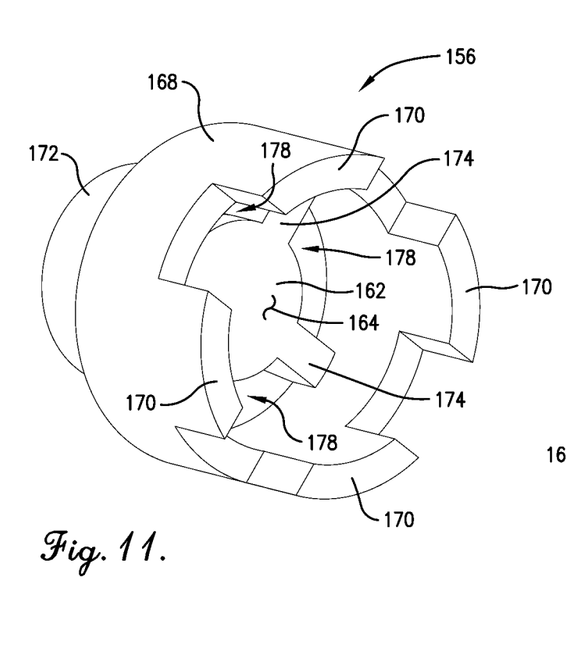
FIG. 11 is an enlarged perspective view of the tube retainer of FIGS. 1-3 and 10 from an upstream viewpoint.
Figure 12:
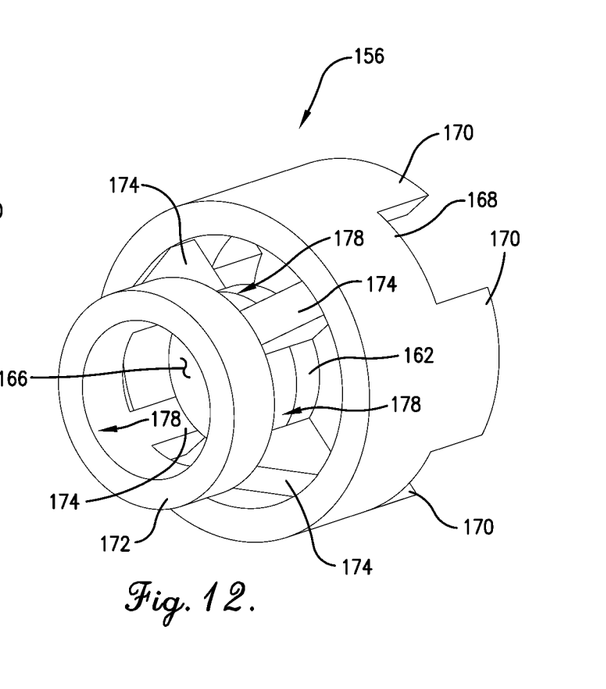
FIG. 12 is an enlarged perspective view of the tube retainer of FIG. 11 from a downstream viewpoint.

As best shown in FIGS. 11 and 12, the tube retainer 156 preferably includes a disk 162 having an upstream face 164 and a downstream face 166, a castellated outer ring 168 defining parapets 170, and an inner support ring 172 spaced longitudinally downstream from the outer ring 168 and the disk 162. The outer ring 168 preferably at least substantially radially encircles the disk 162. Furthermore, a plurality of fins 174 preferably extends radially outwardly and longitudinally downstream from the disk 162 to interconnect the outer ring 168, the support ring 172, and the disk 162.

As best shown in FIG. 3, the downstream portion 120 of the tube body 114, the support ring 172, and the disk 162 are preferably sized such that the downstream portion 120 fits snugly but slidably inside the support ring 172 and is similar or identical in outer diameter to the diameter of the disk 162.

The piston tube 90 is preferably continuously shiftable between two extremes referred to herein as the upstream position and the downstream position. In the upstream position, illustrated in FIG. 3, the pressure-receiving rim 124 of the tube body 114 preferably abuts the downstream face 166 of the disk 162, while the inner downstream surface 136 of the inner downstream projection 134 of the flange 116 of the tube body 114 is preferably longitudinally spaced from the valve body 20. More particularly, the valve body 20 preferably defines a shelf 176, and the inner downstream surface 136 is longitudinally spaced from the shelf 176. Conversely, in the downstream position, illustrated in FIGS. 1 and 2, the pressure-receiving rim 124 of the tube body 114 is preferably longitudinally spaced from the downstream face 166 of the disk 162, while the inner downstream surface 136 of the inner downstream projection 134 preferably abuts the shelf 176.

Figure 10:
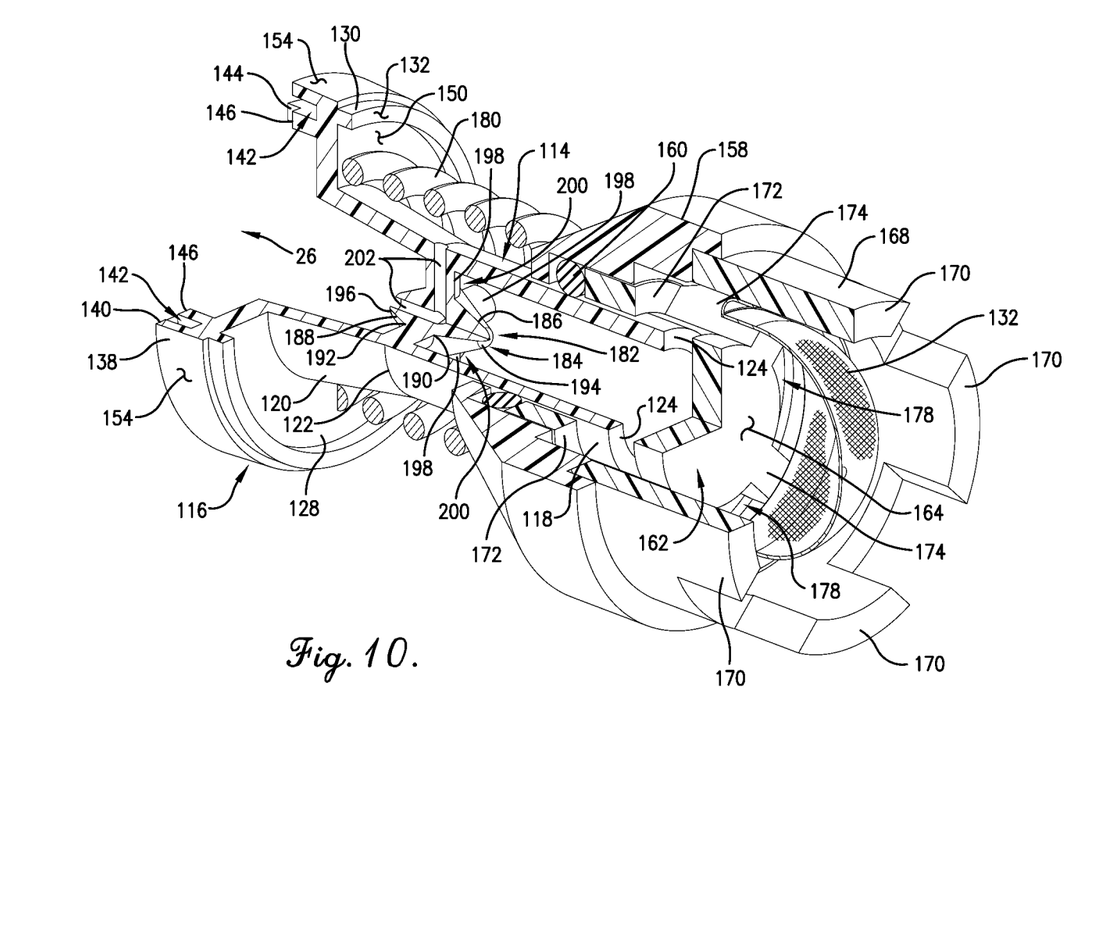
FIG. 10 is a cross-sectional perspective view of a portion of the valve assembly of FIGS. 1-3 from an upstream viewpoint, particularly illustrating the piston tube in an intermediate position.

An infinite number of intermediate positions are preferably possible as well, with one such intermediate position being illustrated in part in FIG. 10. In such intermediate positions, an upstream gap is formed between the pressure-receiving rim 124 of the tube body 114 and the downstream face 166 of the disk 162; and a downstream gap is formed between the inner downstream surface 136 of the inner downstream projection 134 and the shelf 176 of the valve body 20.

As best shown in FIGS. 11 and 12, the fins 174, the disk 162, the outer ring 168, and the support ring 172 of the tube retainer 156 at least in part define a plurality of inlet flow paths 178 through the tube retainer 156. The piston tube 90 preferably increasingly blocks the inlet flow paths 178 when shifting toward the upstream position, such that fluid flowing through the inlet flow paths 178 increases in velocity. Conversely, the piston tube 90 preferably increasingly opens the inlet flow paths 178 when shifting toward the downstream position, such that fluid flowing through the inlet flow paths 178 decreases in velocity. Shifting of the piston tube 90 relative to the tube retainer 156 thereby at least substantially regulates the velocity of a fluid flowing through the inlet flow paths 178 and, in turn, the pressure of a fluid flowing therethrough.

Shifting of the piston tube 90 is preferably a consequence at least in part of an imbalance in the forces exerted on the pressure-receiving face 148 and the pressure-receiving rim 124, due at least in part to fluid pressure exerted thereon by fluid in the downstream chamber 92 and the upstream chamber 126, respectively. More particularly, the pressure-receiving face 148 presents a face area, while the pressure-receiving rim 124 presents a rim area. The force applied against the pressure-receiving face 148 is preferably at least substantially dependent on the face area and the magnitude of the fluid pressure in the downstream chamber 92. Similarly, the force applied against the pressure-receiving rim is preferably at least substantially dependent on the rim area and the magnitude of the fluid pressure in the upstream chamber 126.

In a preferred embodiment, as illustrated, the face area is greater than the rim area to define an area differential. Although variation is permissible within the scope of the present invention, an area ratio between 9:1 and 15:1 is preferred, with an area ratio of approximately 12:1 being most preferable.

Presence of an area differential strongly influences the behavior of the piston tube 90 when subjected to fluid pressures from a fluid flowing therethrough along the flow path 26. For instance, at least in part as a result of the area differential, generally equal pressures on the pressure-receiving face 148 and the pressure-receiving rim 124 result in unequal forces on the pressure-receiving face 148 and the pressure-receiving rim 124. More particularly, the presence of an area differential in which the face area is greater than the rim area dictates that generally equal pressures in the upstream chamber 126 and the downstream chamber 92 result in imbalanced forces that bias the piston tube 90 toward the upstream position. That is, the force due to fluid pressure is greater on the pressure-receiving face 148 than on the pressure-receiving rim 124. Furthermore, maintaining generally equal pressures but increasing their magnitude results in an increased force imbalance and, more particularly, in a greater bias toward the upstream position. Other effects of the area differential, including more complex effects associated with unequal and/or graduated or variable pressures on the pressure-receiving face 148 and/or the pressure-receiving rim 124, will be readily understood by one skilled in the art.

In view of the above, it is clear that shifting of the piston tube 90 at least substantially regulates the pressure of fluid in the downstream chamber 92, both as a result of the velocity effects discussed above with respect to the inlet flow paths 178 and as a result of the expansion and contraction of the volume of the downstream chamber 92 as the flange 116 moves toward and away from the flow control member 94 in conjunction with the shifting. That is, the piston tube 90 regulates the pressure of the fluid that reaches the flow control member 94, and the flow control member 94 regulates flow of the fluid into the valve portion 18.

Fresh water pressure in the U.S. typically falls within the range of 20 psi to 120 psi. The illustrated pressure-regulating portion is particularly configured to operate within this customary range, with shifting of the piston tube 90 (and the effects of any other structures) regulating the pressure in the downstream chamber to approximately 20 psi. Inlet pressures and the degree to which pressure is regulated may be varied, however, without departing from the scope of the present invention.

In a preferred embodiment, the pressure-regulating portion 14 further includes a spring 180 that yieldably urges the piston tube 90 toward the downstream position. Thus, some of the effects of the previously discussed area differential may be mitigated to an extent depending at least in part on the stiffness of the spring. It is permissible, however, for no spring to be used, or for the spring to urge the piston tube in a different direction than described herein.

Preferably, the spring 180 is coiled about the tube body 114 and housed in the outer chamber 152. However, it is permissible for alternative configurations of the spring to be used or for multiple springs to be used. For instance, the spring might be of a coiled type but positioned adjacent the tube body, or a plurality of coiled springs might be spaced about the outside of the tube body. Similar arrangements might be used for non-coiled spring elements such as elastic cables, as well.

Preferably, the spring 180 is secured at an upstream end to the end plug 158 and at a downstream end to the upstream face 150 of the flange 116 by any means known in the art, although other securement locations are permissible, as well.

In a preferred embodiment, the pressure-regulating portion 14 includes a venturi element 182 disposed in the flow path 26. Preferably, the venturi element 182 is located inside the piston tube 90 and positioned adjacent the transition point 122, although positioning of the venturi element at other locations within the flow path is permissible according to certain aspects of the present invention.

Preferably, the venturi element 182 includes a flow restriction 184 including upstream and downstream cones 186 and 188, respectively. Each cone 186 and 188 preferably has a respective base 190 or 192 and a respective tip 194 or 196. Preferably, the tips 194 and 196 are each smoothed or rounded. However, it is permissible for non-smoothed or rounded tips to be provided or for the tips to vary from each other. Furthermore, it is permissible for only a single cone to be provided, or for the flow restriction to be of an entirely different shape.

Preferably, the venturi element 182 includes a plurality of arms 198 supporting the flow restriction 184 in a spaced relationship from the piston tube 90. More particularly, the arms 198 preferably connect the bases 190 and 192 to the piston tube 90. It is permissible, however, for only one arm to be used, for the arm or arms to connect to only one of the bases, or for the arm or arms to connect to an alternative region or regions of the flow restriction.

Preferably, the arms 198 are integrally formed with both the tube body 114 and the cones 186 and 188, although it is permissible within the scope of the present invention for the arm or arms to be non-integral with either or both of the cones and/or the tube body.

The arms 198 are preferably arcuately spaced apart to define a plurality of flow portals 200 therebetween. Furthermore, such arcuate spacing is preferably even, and the arms are preferably each of the same length. However, it is permissible for uneven and/or non-arcuate arm spacing to be provided and/or for the arms to vary in length, such that the flow restriction would not be positioned concentrically within the piston tube.

It is also possible for the flow restriction to be supported in the flow path by entirely different means, including any means known in the art that allow flow of a fluid by or through the flow restriction, without departing from the spirit of the present invention.

The pressure-regulating portion 14 preferably further includes a vent 202 fluidly interconnecting the flow path 26 and the outer chamber 152, such that a pressure drop associated with flow through the venturi element 182 draws fluid from the outer chamber 152 through the vent 202 and into the flow path 26. Such venting decreases or eliminates the influence of fluid in the outer chamber 152 on the shifting of the piston tube 90. That is, fluid pressure build-up in the outer chamber 152 and resultant biasing of the piston tube 90 toward the downstream position is avoided.

Preferably, the vent 202 extends from the downstream tip 196 to the base 192 of the downstream cone 188, through an opposing pair of the arms 198, and through the tube body 114 at corresponding positions along the transition point 122 to the outer chamber 152. However, the vent may extend through any part or parts of the venturi element and the tube body without departing from the scope of the present invention. Among other things, for instance, the entry of the vent into the downstream cone might be offset; the vent might extend through a non-opposing pair of arms, all of the arms, or only one of the arms; and/or the vent might extend through the tube body at a location or locations remote from the transition point. Even further, it is permissible for the vent to extend through the tube body adjacent the venturi element but not through the venturi element itself.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A valve assembly configured to control the flow of a fluid therethrough, said valve assembly comprising:
   a valve body defining an inlet, an outlet, and a flow path extending therebetween; and
   a pressure-regulating assembly including—
      a longitudinally extending piston tube shiftably mounted in the valve body,
      said piston tube at least in part defining an outer chamber,
      said flow path extending through the piston tube,
      a venturi element disposed in the flow path, and
      a vent fluidly interconnecting the flow path and the outer chamber such that a pressure drop associated with fluid flow through the venturi element draws fluid from the outer chamber through the vent and into the flow path,
   said venturi element being located inside the piston tube,
   said venturi element comprising a flow restriction located within the piston tube,
   said venturi element including at least one arm supporting the flow restriction in a spaced relationship from the piston tube.

2. The valve assembly as claimed in claim 1, said valve assembly further comprising a valve portion operable to selectively allow or obstruct fluid flow to the outlet.

3. The valve assembly as claimed in claim 1, said vent extending though the at least one arm and the flow restriction.

4. The valve assembly as claimed in claim 3, said flow restriction including an upstream cone having an upstream tip and a downstream cone having a downstream tip.

5. The valve assembly as claimed in claim 4, said upstream tip and said downstream tip being rounded.

6. The valve assembly as claimed in claim 4, said vent extending through said downstream cone.

7. The valve assembly as claimed in claim 6, said downstream cone having a base, said at least one arm connecting the base to the piston tube, said vent extending from the base through the at least one arm and through the piston tube.

8. The valve assembly as claimed in claim 7, said venturi element including a plurality of arms supporting the upstream cone and the downstream cone in the flow path, said arms connecting the base to the piston tube, said arms being arcuately spaced apart to define a plurality of flow portals therebetween, said vent extending from the base through each of said arms and through the piston tube.

9. A valve assembly configured to control the flow of a fluid therethrough, said valve assembly comprising:
   a valve body defining an inlet, an outlet, and a flow path extending therebetween; and
   a pressure-regulating assembly including—
      a longitudinally extending piston tube shiftably mounted in the valve body,
      said piston tube at least in part defining an outer chamber,
      said flow path extending through the piston tube,
      a venturi element disposed in the flow path, and
      a vent fluidly interconnecting the flow path and the outer chamber such that a pressure drop associated with fluid flow through the venturi element draws fluid from the outer chamber through the vent and into the flow path,
   said venturi element being located inside the piston tube,
   said flow path presenting a downstream chamber fluidly located between the piston tube and the outlet, with shifting of the piston tube serving to at least substantially regulate pressure within the downstream chamber,
   said pressure-regulating assembly including a spring that yieldably urges the piston tube in a biased direction,
   said spring being located within the outer chamber.

10. The valve assembly as claimed in claim 9,
said valve assembly further comprising a valve portion operable to selectively allow or obstruct fluid flow to the outlet.

11. A valve assembly configured to control the flow of a fluid therethrough, said valve assembly comprising:
a valve body defining an inlet, an outlet, and a flow path extending therebetween; and
a pressure-regulating assembly including—
a longitudinally extending piston tube shiftably mounted in the valve body,
said piston tube at least in part defining an outer chamber,
said flow path extending through the piston tube,
a venturi element disposed in the flow path, and
a vent fluidly interconnecting the flow path and the outer chamber such that a pressure drop associated with fluid flow through the venturi element draws fluid from the outer chamber through the vent and into the flow path,
said flow path presenting a downstream chamber fluidly located between the piston tube and the outlet, with shifting of the piston tube serving to at least substantially regulate pressure within the downstream chamber,
said piston tube including a longitudinally extending tube body and a flange extending outwardly therefrom,
said flange defining a pressure-receiving face,
said tube body defining a pressure-receiving rim,
said tube body defining a longitudinal axis,
said tube body including an upstream portion and a downstream portion,
said upstream portion presenting a uniform cross-sectional dimension along the longitudinal axis,
said downstream portion presenting an expanding cross-sectional dimension along the longitudinal axis in a downstream direction,
said upstream portion and said downstream portion being interconnected at a transition point,
said venturi element being positioned within the piston tube adjacent the transition point.

12. The valve assembly as claimed in claim 11,
said valve assembly further comprising a resiliently deformable flow control member that presents an upstream face and defines a central passage,
wherein said flow control member is configured to deform in such a manner that the central passage shrinks when a pressure applied to the upstream face by fluid in the downstream chamber increases and expands when a pressure applied to the upstream face by fluid in the downstream chamber decreases.

13. The valve assembly as claimed in claim 11,
said vent extending through said tube body at the transition point.

14. The valve assembly as claimed in claim 11,
said flange defining an upstream face opposite the pressure-receiving face and at least in part defining the outer chamber.

15. The valve assembly as claimed in claim 11,
said valve assembly further comprising a valve portion operable to selectively allow or obstruct fluid flow to the outlet.

16. The valve assembly as claimed in claim 11,
said pressure-receiving face at least in part defining the downstream chamber, such that fluid pressure within the downstream chamber is exerted against the pressure-receiving face,
said flange engaging said valve body to form an at least substantially fluid-tight seal between the downstream chamber and the outer chamber.

17. The valve assembly as claimed in claim 16,
said flow path presenting an upstream chamber fluidly located between the piston tube and the inlet, with fluid pressure within the upstream chamber being exerted against the pressure-receiving rim.

18. The valve assembly as claimed in claim 17,
said piston tube being continuously shiftable between an upstream position and a downstream position.

19. The valve assembly as claimed in claim 18,
said pressure-receiving face having a face area,
said pressure-receiving rim having a rim area,
said face area being greater than the rim area to define an area differential,
whereby generally equal pressures on the pressure-receiving face and the pressure-receiving rim result in imbalanced forces that bias the piston tube toward the upstream position.

20. The valve assembly as claimed in claim 19,
said pressure-regulating assembly further including a spring disposed in the outer chamber and configured to bias the piston tube toward the downstream position.

21. The valve assembly as claimed in claim 19,
said pressure-regulating assembly further including a tube retainer including a support ring slidably supporting the piston tube.

22. The valve assembly as claimed in claim 21,
said tube retainer further including a disk having a downstream face,
said disk spaced longitudinally upstream from the support ring,
said piston tube configured to abut the downstream face when in the upstream position and to be longitudinally spaced from the downstream face when in the downstream position.

23. The valve assembly as claimed in claim 22,
said tube retainer further including an outer ring and a plurality of arcuately spaced apart fins extending between and interconnecting the disk, the support ring, and the outer ring,
said outer ring, said fins, said disk, and said support ring at least in part cooperatively defining a plurality of inlet flow paths through the tube retainer,
said piston tube configured to increasingly block said inlet flow paths when shifting toward the upstream position, such that fluid flowing through said inlet flow paths increases in velocity,
said piston tube configured to increasingly open said inlet flow paths when shifting toward the downstream position, such that fluid flowing through said inlet flow paths decreases in velocity,
shifting of said piston tube relative to the tube retainer thereby at least substantially regulating the velocity and, in turn, the pressure of a fluid flowing therethrough.

* * * * *